(12) United States Patent
Tsuchida et al.

(10) Patent No.: US 12,153,993 B2
(45) Date of Patent: Nov. 26, 2024

(54) WIRELESS TAG-CONTAINING MEDIUM ISSUING APPARATUS AND INFORMATION PROCESSING APPARATUS

(71) Applicant: Toshiba Tec Kabushiki Kaisha, Tokyo (JP)

(72) Inventors: Sunao Tsuchida, Mishima Shizuoka (JP); Sadatoshi Oishi, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/349,048

(22) Filed: Jul. 7, 2023

(65) Prior Publication Data

US 2024/0028845 A1  Jan. 25, 2024

(30) Foreign Application Priority Data

Jul. 22, 2022 (JP) .................. 2022-117297

(51) Int. Cl.
*G06K 7/10* (2006.01)
*B41J 3/407* (2006.01)

(52) U.S. Cl.
CPC ........ *G06K 7/10455* (2013.01); *B41J 3/4075* (2013.01); *G06K 7/10297* (2013.01)

(58) Field of Classification Search
CPC ................ G06K 7/10455; G06K 7/10297; B41J 3/4075
See application file for complete search history.

(56) References Cited

U.S. PATENT DOCUMENTS

| | | | |
|---|---|---|---|
| 2007/0194879 A1* | 8/2007 | Backes | G06K 7/0008 713/168 |
| 2018/0341243 A1 | 11/2018 | Oishi | |
| 2019/0141210 A1* | 5/2019 | Eiiliott | H04N 1/32138 |
| 2021/0075097 A1 | 3/2021 | Tsuchida | |
| 2022/0004724 A1 | 1/2022 | Tsuchida | |

FOREIGN PATENT DOCUMENTS

JP  2007018036 A  1/2007

\* cited by examiner

*Primary Examiner* — Jamara A Franklin
(74) *Attorney, Agent, or Firm* — Kim & Stewart LLP

(57) ABSTRACT

According to one embodiment, a wireless-tagged label issuing apparatus includes a conveying roller to convey the label that has a wireless tag, an antenna for communicating with the wireless tag of the label, a tag reader to read a tag identification from the wireless tag via the antenna, and a control unit. The control unit is configured to compare the read tag identification to previously read tag identifications, and execute a first operation on the label if the read tag identification matches a previously read tag identification and a second operation on the label if the read tag identification does not match a previously read tag identification. For example, the first operation may be physically disabling the wireless tag, printing a voiding image on the label, or routing the label to a particular destination for invalid labels or the like.

20 Claims, 13 Drawing Sheets

WIRELESS TAG-CONTAINING MEDIUM ISSUING APPARATUS AND INFORMATION PROCESSING APPARATUS

CROSS-REFERENCE TO RELATED APPLICATION

This application is based upon and claims the benefit of priority from Japanese Patent Application No. 2022-117297, filed Jul. 22, 2022, the entire contents of which are incorporated herein by reference.

FIELD

Embodiments described herein relate generally to a wireless tag-containing medium issuing apparatus and an information processing apparatus.

BACKGROUND

When a label containing a rewritable radio frequency identification (RFID) tag is issued, a label issuing apparatus executes printing on the label and may also write a tag ID correlated with the article to which the label is to be attached into the RFID tag. On the other hand, if a label containing a non-rewritable read only memory (ROM) type RFID tag is to be issued, the label issuing apparatus needs only to execute printing on the label and correlate the article to which the label is to be attached to an already set tag ID.

To permit individual management (tracking) of the articles to which such labels are to be attached, tag IDs need to be unique for each label. However, with a non-rewritable RFID tag, the tag ID is set in the process of manufacturing the RFID tag, and thus is fixed in the manufacturing process. Thus, there may be a case where the tag ID stored in a non-rewritable RFID tag is not unique due to a bit error or the like caused by a tag failure. In such a case, labels containing RFID tags with the same tag ID will be attached to different articles. As a result, it may be difficult to individually manage the articles to which the labels are attached.

DETAILED DESCRIPTION

Embodiments provide a technique capable of preventing issuance of labels with wireless tags having non-unique identification information.

In general, according to one embodiment, a wireless tag-containing medium issuing apparatus includes a conveying roller configured to convey a medium including a wireless tag. The apparatus has an antenna for communicating with the wireless tag and a reader configured to read a tag identification from the wireless tag through the antenna. A control unit of the apparatus is configured to: compare the read tag identification to previously read tag identifications, and execute a first operation on the medium if the read tag identification matches a previously read tag identification and a second operation on the medium if the read tag identification does not match a previously read tag identification. The first operation is different from the second operation.

First Embodiment

Hereinafter, a first embodiment will be described using the drawings.

Configuration Example

Figure 1:
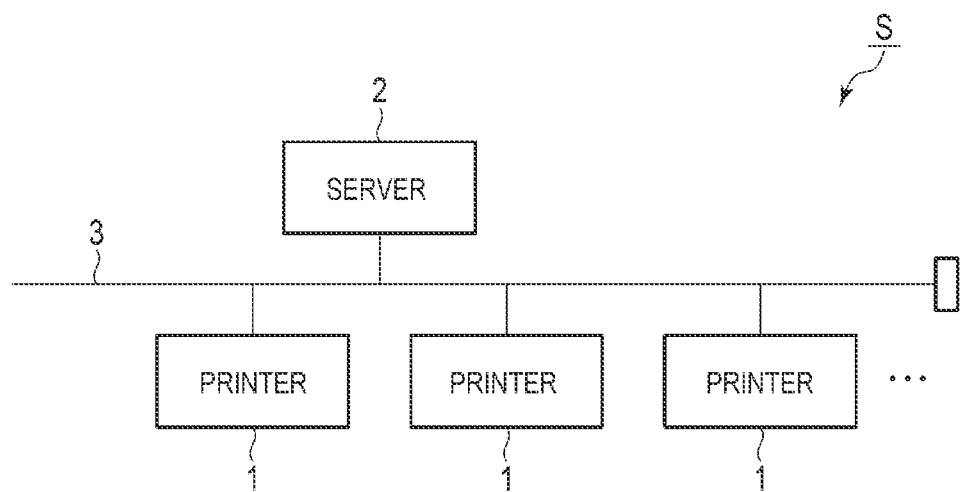
FIG. 1 is a block diagram of a wireless tag-containing medium issuing system according to a first embodiment.

FIG. 1 is a block diagram illustrating a configuration example of a wireless tag-containing medium issuing system S.

The wireless tag-containing medium issuing system S includes a plurality of printers 1 and a server 2. The plurality of printers 1 and the server 2 are communicably connected to each other through a network 3. For example, the network 3 is a local area network (LAN) or the like but is not limited thereto. The LAN may be a wireless LAN or a wired LAN. FIG. 1 illustrates the plurality of printers 1. The wireless tag-containing medium issuing system S only needs to include one or more printers 1. The wireless tag-containing medium issuing system S also refers to a system including at least two electronic apparatuses.

Figure 2:
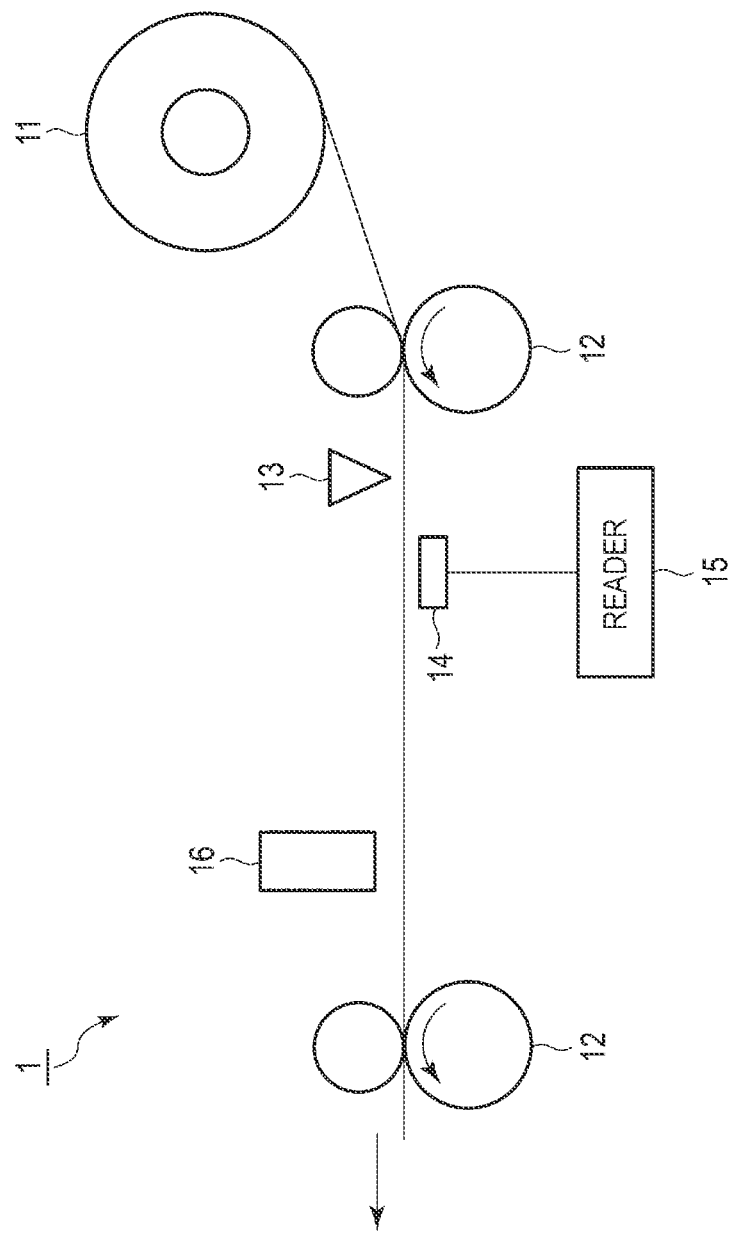
FIG. 2 is a diagram of a printer.

FIG. 2 is a diagram illustrating a configuration example of the printer 1.

Figure 3:
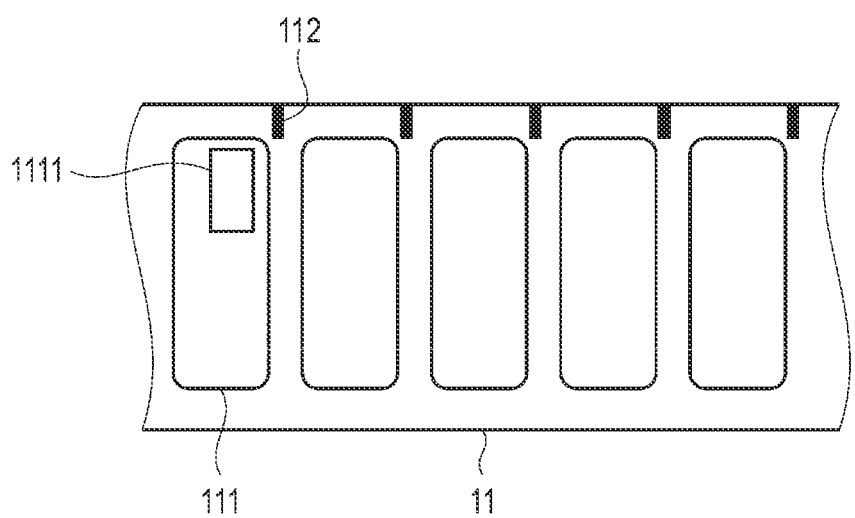
FIG. 3 is a diagram of a sheet used in a printer.

FIG. 3 is a diagram illustrating a configuration example of a sheet 11 used in the printer 1.

The printer 1 is an electronic apparatus having a printing function. The printing may include not only printing of text but also printing of various images such as patterns. The printer 1 is an example of the wireless tag-containing medium issuing apparatus.

The printer 1 includes the sheet 11, a plurality of conveying rollers 12, a sensor 13, an antenna 14, a reader 15, and a print head 16.

The sheet 11 is a member where a plurality of labels 111 are disposed in a longitudinal direction. The plurality of labels 111 are disposed such that intervals between the centers of adjacent labels 111 are regular. The label 111 is an example of a medium formed of various materials such as paper.

In the sheet 11, a plurality of marks 112 are provided in the longitudinal direction. The plurality of marks 112 are disposed such that intervals between adjacent marks 112 are regular and are the same as the intervals between the centers of adjacent labels 111. For example, the mark 112 is provided at an end portion in a width direction of the sheet 11 perpendicular to the longitudinal direction of the sheet 11. A location where the marks 112 is provided on the sheet 11 may any location. The mark 112 may be a black mark.

The label 111 includes a wireless tag 1111. A location where the wireless tag 1111 is attached to the label 111 may be any location of the label 111.

The wireless tag 1111 is an IC tag including an IC chip and an antenna. Typically, the wireless tag 1111 is an RFID tag but may be another IC tag. The wireless tag 1111 is a passive type wireless tag that operates using a radio wave emitted from the antenna 14 as an energy source. The wireless tag 1111 transmits a signal including a tag ID through the antenna, the tag ID being stored in the IC chip of the wireless tag 1111. The tag ID is an example of the identification information of the wireless tag 1111.

The plurality of conveying rollers 12 convey the sheet 11. Conveying the sheet 11 includes conveying the labels 111. In the example of FIG. 2, the plurality of conveying rollers 12 convey the sheet 11 to the left side. A direction in which the sheet 11 is conveyed will also be referred to as "conveying direction".

The sensor 13 is disposed upstream of the antenna 14 in the conveying direction. The sensor 13 detects the mark 112 provided on the sheet 11. For example, the sensor 13 is an optical sensor that optically detects the mark 112. Based on the detection of the mark 112 by the sensor 13, the printer 1 detects the label 111 closest to the detected mark 112, the label 111 being provided upstream of the detected mark 112 in the conveying direction.

The antenna 14 is provided to face a surface of the sheet 11. The antenna 14 is provided downstream of the sensor 13 in the conveying direction and upstream of the print head 16 in the conveying direction. The antenna 14 emits a radio wave. The antenna 14 receives the radio wave emitted from the wireless tag 1111. The antenna 14 converts the radio wave emitted from the wireless tag 1111 into a signal and outputs the signal to the reader 15.

The reader 15 reads the tag ID of the wireless tag 1111 through the antenna 14. For example, the reader 15 reads the tag ID of the wireless tag 1111 using a well-known technique based on the signal acquired through the antenna 14.

The print head 16 is a head for printing an image on the label 111. The print head 16 is disposed downstream of the antenna 14 in the conveying direction. A printing type of the print head 16 is not limited as long as the print head 16 has a function of printing an image on the label 111. If the label 111 includes a heat-sensitive layer, the print head 16 may adopt a type of printing an image on the label 111 including a heat-sensitive layer using heat generated from each of heating elements. The print head 16 may be a type of printing an image on the label 111 by melting ink in an ink ribbon using heat generated from each of heating elements. The print head 16 may adopt a type of printing an image on the label 111 using an ink jet method.

Figure 4:
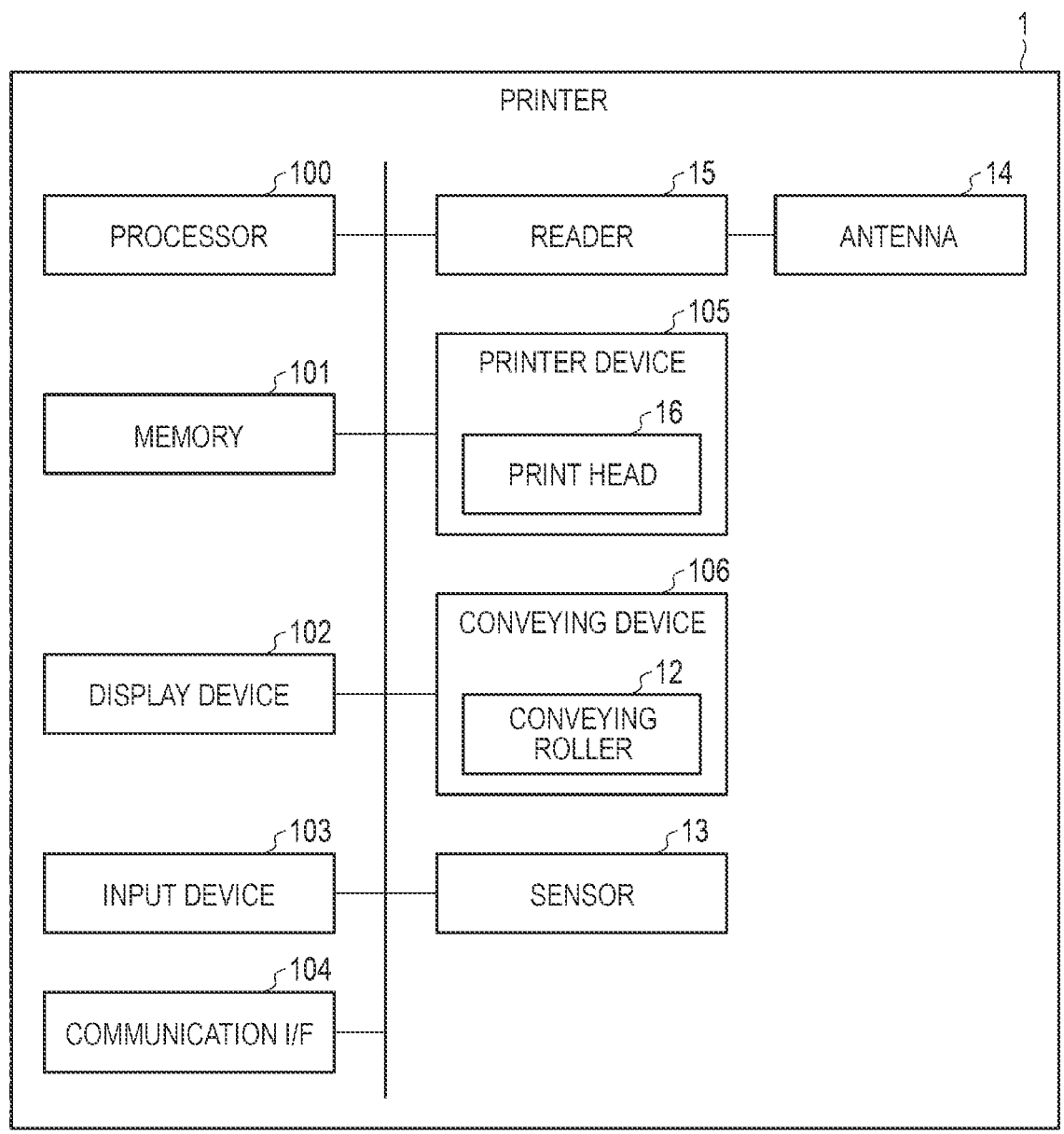
FIG. 4 is a block diagram illustrating aspects of a printer.

FIG. 4 is a block diagram illustrating aspects of the printer 1. The printer 1 includes a processor 100, a memory 101, a display device 102, an input device 103, a communication interface 104, a printer device 105, and a conveying device 106. In FIG. 4, the interface is labeled as "I/F".

The processor 100 corresponds to a central part of the printer 1. The processor 100 may be a processor such as a central processing unit (CPU). In addition to, or instead of a CPU, the processor 100 may incorporate an application specific integrated circuit (ASIC), a field-programmable gate array (FPGA), or a graphics processing unit (GPU). The processor 100 loads a program to the memory 101. The processor 100 executes various processes by executing the program loaded on the memory 101. The program is a program for causing the processor 100 to execute various processes. The processor 100 is an example of the control unit of the printer 1.

The memory 101 includes an element corresponding to a main memory part of the printer 1. The memory 101 includes a nonvolatile memory area and a volatile memory area. The memory 101 stores an operating system or a program in the nonvolatile memory area. The memory 101 may use the volatile memory area as a work area where data is appropriately rewritten by the processor 100. For example, the memory 101 includes a read only memory (ROM) as the nonvolatile memory area. For example, the memory 101 includes a random access memory (RAM) as the volatile memory area. The memory 101 may include an element corresponding to an auxiliary storage part of the printer 1. For example, the memory 101 may include a hard disk drive (HDD), a solid-state drive (SSD), or a semiconductor storage medium such as a flash memory. The memory 101 may store the program in the auxiliary storage part. The memory 101 is an example of a storage unit of the printer 1.

The display device 102 can display an image. The display device 102 can be, for example, a liquid crystal display or an organic electroluminescence (EL) display but is not limited thereto.

The input device 103 is for inputting an instruction based on a user operation. The input device 103 may include a pressable button. The input device 103 may include a touch panel that is integrated with the display device 102.

The communication interface 104 is an interface for communicatively connecting the printers 1 and the server 2 to each other through the network 3. The communication interface 104 is an example of a communication unit of the printer 1.

The printer device 105 is a device for printing an image on the label 111. The printer device 105 includes the print head 16. The printer device 105 is an example of the printing unit configured to print an image on the label 111.

The conveying device 106 is a device for conveying the sheet 11. The conveying device 106 includes the plurality of conveying rollers 12. The conveying device 106 is an example of the conveying unit configured to convey the sheet 11.

The hardware configuration of the printer 1 is not limited to the above-described configuration. For the printer 1, the components described above can be removed or modified and new components can be added.

Figure 5:
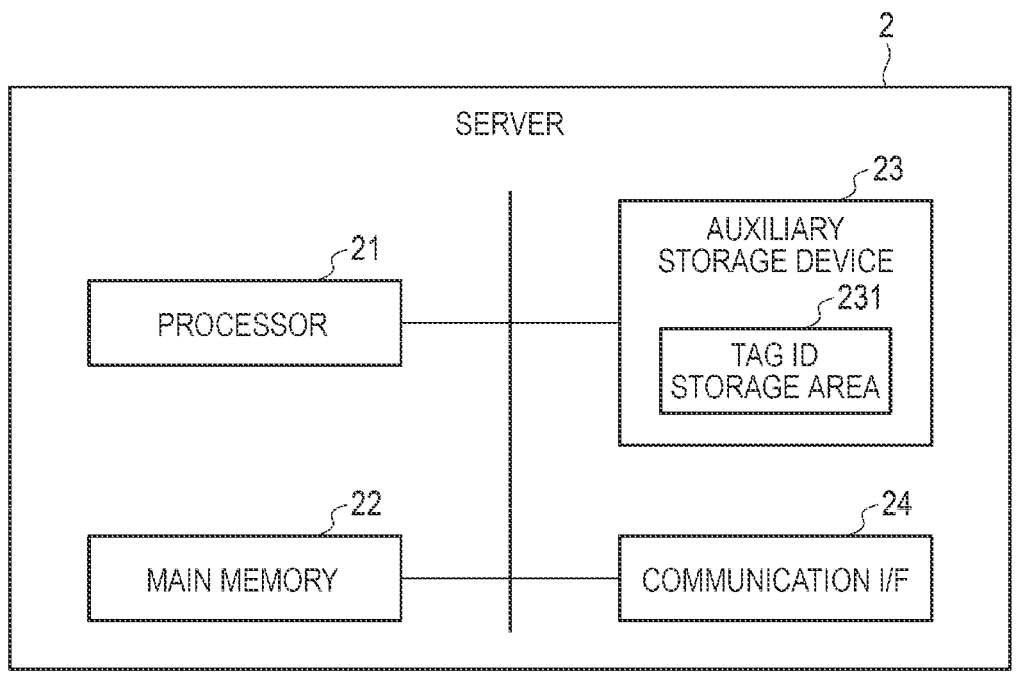
FIG. 5 is a block diagram illustrating aspects of a server.

FIG. 5 is a block diagram illustrating a configuration example of server 2. The server 2 includes a processor 21, a main memory 22, an auxiliary storage device 23, and a communication interface 24. In FIG. 5, the interface is labeled as "I/F". The server 2 is a device that can communicate with the one or more printers 1 through the network 3. The server 2 is an example of an information processing apparatus.

The processor 21 corresponds to a central part of the server 2. The processor 21 may have the same hardware configuration as the processor 100. The processor 21 loads a program stored in advance in the main memory 22 or the auxiliary storage device 23 to the main memory 22. The processor 21 performs various processes by executing the program loaded on the main memory 22. The program is a program for causing the processor 21 to execute various processes. The processor 21 is an example of the control unit of the server 2.

The main memory 22 corresponds to a main memory part of the server 2. The main memory 22 includes a nonvolatile memory area and a volatile memory area. The main memory 22 stores an operating system or a program in the nonvolatile memory area. The main memory 22 may use the volatile memory area as a work area where data is appropriately rewritten by the processor 21. For example, the main memory 22 includes a ROM as the nonvolatile memory area. For example, the main memory 22 includes a RAM as the volatile memory area.

The auxiliary storage device 23 corresponds to an auxiliary storage part of the server 2. For example, the auxiliary storage device 23 may be an HDD, an SSD, or a semiconductor storage medium such as a flash memory. The auxiliary storage device 23 stores programs, data used by the processor 21 to execute various processes, and data generated by the processor 21. The auxiliary storage device 23 is an example of the storage unit of the server 2.

The auxiliary storage device 23 includes a tag ID storage area 231. The tag ID storage area 231 stores tag ID data. The tag ID data is data of the tag IDs of the plurality of wireless tags 1111 read by the one or more printers 1. Hereinafter, the tag ID stored in the tag ID storage area 231 will also be referred to as "registered tag ID". A plurality of registered tag IDs are unique tag IDs. The unique tag IDs are specific tag IDs that do not match each other. Therefore, each of the registered tag IDs does not match another registered tag ID in the plurality of registered tag IDs. The unique tag ID is an example of the unique information or specific information.

If a received tag ID does not match any one of the plurality of registered tag IDs, the server 2 determines that the received tag ID is a unique tag ID. The received tag ID is a tag ID received from the printer 1 by the server 2. If the received tag ID is a unique tag ID, the server 2 stores the received tag ID in the tag ID storage area 231 as a registered tag ID. The server 2 stores the new registered tag ID in the tag ID storage area 231 to update the tag ID data. On the other hand, if a received tag ID matches any one of the already registered tag IDs, the server 2 determines that the received tag ID is not a unique tag ID. If the received tag ID is not a unique tag ID, the server 2 does not store the received tag ID in the tag ID storage area 231 as another registered tag ID.

The tag ID data may include information regarding a target to which the label 111 is to be attached. For example, the information of the target to which the label 111 is to be attached may be information such as a model number of an article.

The communication interface 24 is an interface for communicatively connecting the server 2 to the printers 1 through the network 3. The communication interface 24 is an example of a communication unit of the server 2.

The hardware configuration of the server 2 is not limited to the above-described configuration. For the server 2, the components described above can be removed or modified and new components can be added.

Operation Example

Next, processes by the processor 100 of the printer 1 and the processor 21 of the server 2 will be described. The procedure described below is merely exemplary and may be changed as long as results of the processes can be provided. In the procedure described below, steps can be omitted, replaced, and added.

Figure 6:
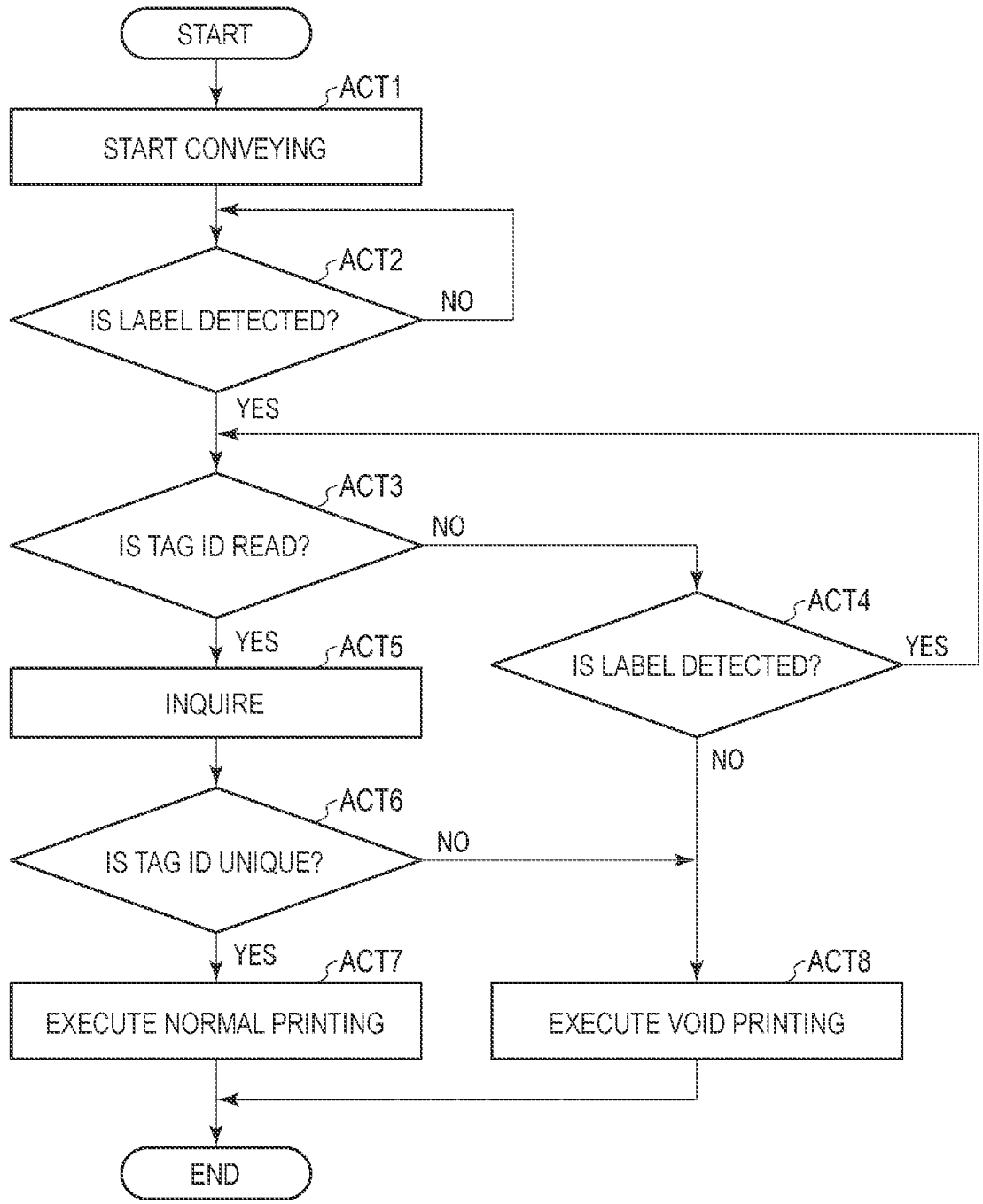
FIG. 6 is a flowchart of a process by a printer.

FIG. 6 is a flowchart illustrating an example of the processing by a printer 1.

The processor 100 controls the conveying device 106 such that the conveyance of the sheet 11 starts (ACT 1). The conveying device 106 conveys the sheet 11.

The processor 100 detects the label 111 based on the mark 112 detected by the sensor 13 (ACT 2). If the processor 100 does not detect the label 111 (ACT 2, NO), the processor 100 continues the process of ACT 2. If the processor 100 detects the label 111 (ACT 2, YES), the process proceeds from ACT 2 to ACT 3.

The processor 100 then acquires the tag ID as read from the wireless tag 1111 by the reader 15 (ACT 3). If the reader 15 cannot read the tag ID from the wireless tag 1111 (ACT 3, NO), the process proceeds from ACT 3 to ACT 4. If the reader 15 reads the tag ID from the wireless tag 1111 (ACT 3, YES), the process proceeds from ACT 3 to ACT 5.

If the reader 15 cannot read the tag ID from the wireless tag 1111 while the sensor 13 is detecting two adjacent two marks 112 on the sheet 11, the processor 100 determines that the label 111 was not detected (ACT 4). If the processor 100 determines that the label 111 is detected (ACT 4, YES), the process returns from ACT 4 back to ACT 3. If the processor 100 determines that the label 111 is not detected (ACT 4, NO), the process proceeds from ACT 4 to ACT 8.

The processor 100 inquires of the server 2 about whether the tag ID (as read by the reader 15) is a unique tag ID (ACT 5). In ACT 5, the processor 100 executes a control to transmit the tag ID using the communication interface 104 to the server 2. The communication interface 104 transmits the tag ID to the server 2 through the network 3. The processor 100 receives a comparison result from the server 2 in response to the transmission of the tag ID. The communication interface 104 receives the comparison result from the server 2 through the network 3. The comparison result includes information indicating whether the tag ID (as read by the reader 15) is a unique tag ID.

The processor 100 determines whether the tag ID is a unique tag ID (ACT 6). In ACT 6, the processor 100 determines whether the tag ID is a unique tag ID based on the comparison result. If the tag ID (as read by the reader 15) is a unique tag ID (ACT 6, YES), the process proceeds from ACT 6 to ACT 7. If the tag ID (as read by the reader 15) is not a unique tag ID (ACT 6, NO), the process proceeds from ACT 6 to ACT 8.

In ACT 7 and ACT 8, the processor 100 executes, on the label 111, a different control depending on whether the tag ID is a unique tag ID or not. Here, in this first embodiment, the processor 100 changes an aspect of printing by the printer device 105 on the label 111 depending on whether the tag ID read by the reader 15 is a unique tag ID or not. In this context, changing an aspect of printing (print aspect) includes changing the image to be printed on the label 111 by the printer device 105 in some manner. The print aspect is changed to distinguish between a label 111 containing a wireless tag 1111 that stores a unique tag ID and a label 111 containing a wireless tag 1111 that stores a non-unique tag ID.

The processor 100 controls the printer device 105 to execute normal printing on the label 111 containing the wireless tag 1111 that stores a unique tag ID (ACT 7). In ACT 7, the processor 100 controls the printer device 105 to print a first image on the label 111. The printer device 105 prints the first image on the label 111 as a normal printing. For example, the first image is a code symbol, a model number, and/or the like relating to an article to which the label 111 is to be attached.

The processor 100 controls the printer device 105 to execute a voiding print (void printing) on the label 111 containing the wireless tag 1111 that stores a non-unique tag ID (ACT 8). In ACT 8, the processor 100 controls the printer device 105 to print a second image on the label 111. The printer device 105 prints the second image on the label 111 as a void printing. In general, the second image only needs to be an image that is different (distinguishable) from a first image and by which the label 111 containing the wireless tag 1111 that stores a non-unique tag ID can be recognized. For example, the second image is text, a symbol, a pattern, and/or the like.

In the above-described example, the processor 100 changes the print aspect on the label 111 by changing the image to be printed on the label 111 by the printer device 105. However, embodiments are not limited thereto. Changing the print aspect of the printer device 105 on the label 111 may include changing whether to print any image or not on the label 111 by the printer device 105. In such an example, if the tag ID read by the reader is a unique tag ID, the processor 100 controls the printer device 105 to execute normal printing on the label 111 as in ACT 7. On the other hand, if the tag ID read by the reader 15 is not a unique tag ID, the processor 100 controls the printer device 105 not to execute any printing on the label 111 rather a voiding image or the like as in ACT 8. Therefore, the process of ACT 8 can be omitted in this example.

Figure 7:
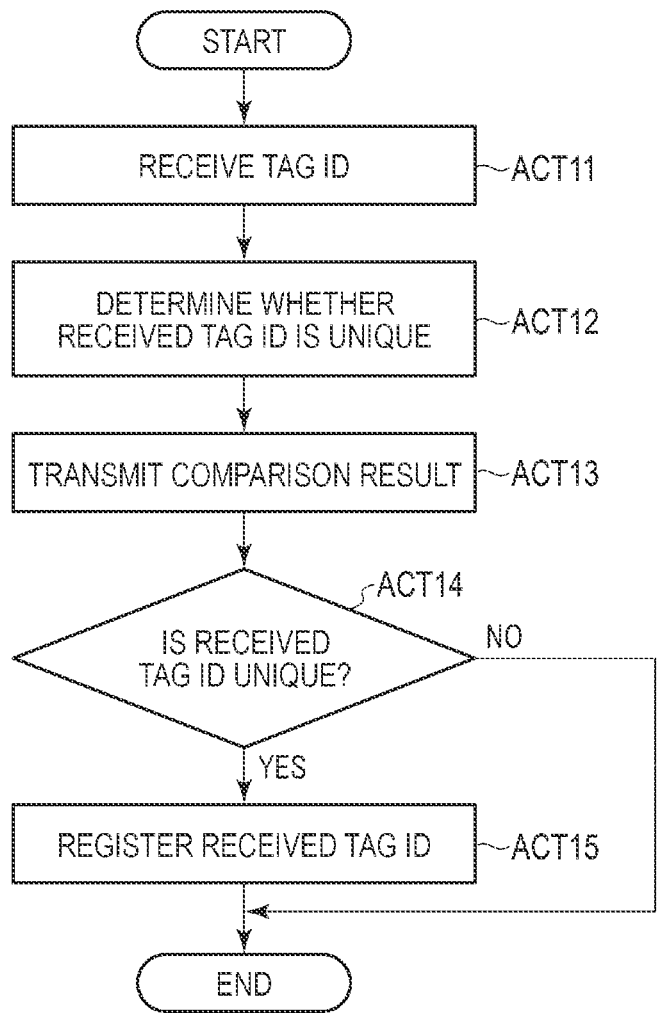
FIG. 7 is a flowchart of a process by a server.

FIG. 7 is a flowchart illustrating an example of the processing by the server 2. Here, the processing of the server 2 relates to the tag ID of the wireless tag 1111 as read by any printer 1 among the printers 1 will be described.

The processor 21 receives the tag ID of the wireless tag 1111 (as read by the printer 1) from the printer 1 using the communication interface 24 (ACT 11). The communication interface 24 receives the tag ID from the printer 1 through the network 3.

The processor 21 determines whether the received tag ID is a unique tag ID (ACT 12). In ACT 12, the processor 21 checks whether the received tag ID is a unique tag ID by comparison to the plurality of registered tag IDs already stored in the tag ID storage area 231. That is, the processor 21 compares the received tag ID to the plurality of registered tag IDs stored in the tag ID storage area 231. If the received tag ID does not match any one of the already registered tag IDs, the processor 21 determines that the received tag ID is a unique tag ID. On the other hand, if the received tag ID matches any of the already registered tag IDs, the processor 21 determines that the received tag ID is not a unique tag ID.

The processor 21 transmits the comparison result to the printer 1 using the communication interface 24 (ACT 13). The communication interface 24 transmits the comparison result to the printer 1 through the network 3.

If the received tag ID is not a unique tag ID (ACT 14, NO), the process ends. If the received tag ID is a unique tag ID (ACT 14, YES), the process proceeds from ACT 14 to ACT 15. If the received tag ID is a unique tag ID, the processor 21 stores the received tag ID in the tag ID storage area 231 as a new registered tag ID (ACT 15).

Effects

The wireless tag-containing medium issuing apparatus according to the first embodiment includes a conveying unit configured to convey a medium containing a wireless tag. The wireless tag-containing medium issuing apparatus includes an antenna. The wireless tag-containing medium issuing apparatus includes a reader configured to read identification information of the wireless tag through the antenna. The wireless tag-containing medium issuing apparatus includes a control unit configured to execute, on the medium, a control corresponding to whether the identification information read by the reader is unique information.

As a result, the wireless tag-containing medium issuing apparatus can execute a control for distinguishing between a medium containing a wireless tag that stores unique identification information and a medium containing a wireless tag that stores non-unique identification information. Therefore, the wireless tag-containing medium issuing apparatus can prevent issuance of a medium containing a wireless tag that stores non-unique identification information.

The wireless tag-containing medium issuing apparatus according to the first embodiment includes a printing unit. The control unit changes a print aspect of the printing unit depending on whether the identification information is unique information or not.

As a result, the wireless tag-containing medium issuing apparatus can distinguish between a medium containing a wireless tag that stores unique identification information and a medium containing a wireless tag that stores non-unique identification information by differential printing or the like. Therefore, the wireless tag-containing medium issuing apparatus can prevent issuance of a medium containing a wireless tag that stores non-unique identification information.

The information processing apparatus according to the first embodiment is an apparatus capable of communicating with one or more wireless tag-containing medium issuing apparatuses. The information processing apparatus stores different identification information of a plurality of wireless tags read by the one or more wireless tag-containing medium issuing apparatuses. The information processing apparatus receives the identification information of the wireless tag read by the wireless tag-containing medium issuing apparatus from one wireless tag-containing medium issuing apparatus among the one or more wireless tag-containing medium issuing apparatuses. The information processing apparatus includes a control unit configured to determine whether the identification information of the wireless tag received by the communication unit is unique information based on the identification information of the plurality of wireless tags stored in the storage unit and, if the identification information is unique information, configured to store the identification information in the storage unit. The communication unit transmits information regarding whether the identification information is unique information to the wireless tag-containing medium issuing apparatus.

As a result, the information processing apparatus can manage not only the one wireless tag-containing medium issuing apparatus but also the plurality of wireless tag-containing medium issuing apparatuses to detect non-unique identification information. Therefore, the information processing apparatus can prevent issuance of a medium containing a wireless tag that stores non-unique identification information.

Second Embodiment

Hereinafter, a second embodiment will be described using the drawings.

In the second embodiment, the same configurations as those of the first embodiment are represented by the same reference numerals, and additional description thereof may be omitted. In the present description of the second embodiment, differences from the first embodiment will be mainly described.

Configuration Example

A wireless tag-containing medium issuing system S may be the same overall as described for the first embodiment using FIG. 1 (excepting at least one printer 1 is replaced with a printer 1*b*).

Figure 8:
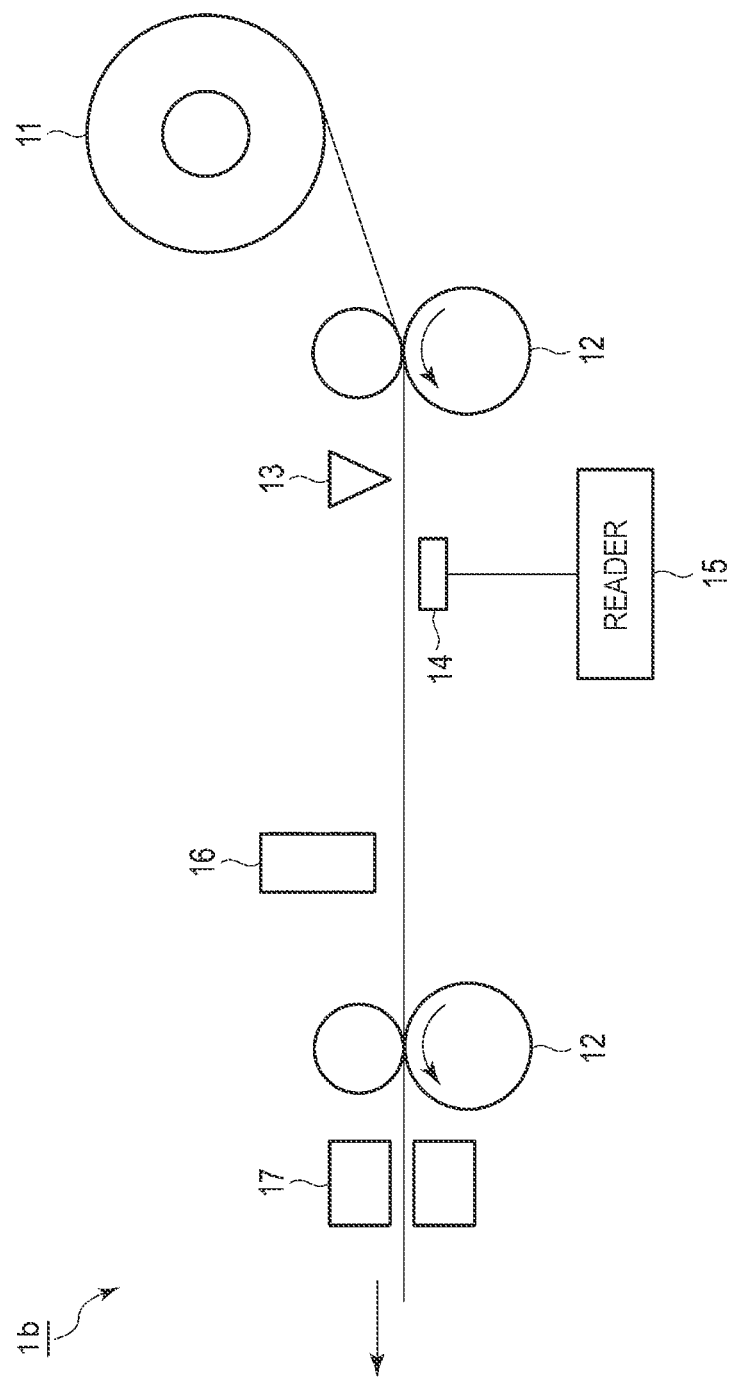
FIG. 8 is a diagram of a printer according to a second embodiment.

A configuration example of the printer 1b will be described. FIG. 8 is a diagram illustrating the summary of the configuration example of the printer 1b.

As for printer 1 of the first embodiment, the printer 1b includes the sheet 11, the plurality of conveying rollers 12, the sensor 13, the antenna 14, the reader 15, and the print head 16. Unlike the first embodiment, the printer 1b includes a punch device 17.

The punch device 17 punches ("punches out") the wireless tag 1111. The punch device 17 is provided downstream of the print head 16 in the conveying direction. Punching the wireless tag 1111 is an example of breaking the wireless tag 1111 to make the wireless tag 1111 unusable (unreadable). The punch device 17 is an example of the breakage unit configured to break the wireless tag 1111 to make the wireless tag 1111 unusable. The breakage of the wireless tag 1111 is not limited to punching of the wireless tag 1111 and any method may be adopted as long as the wireless tag 1111 can be made unusable thereby.

Figure 9:
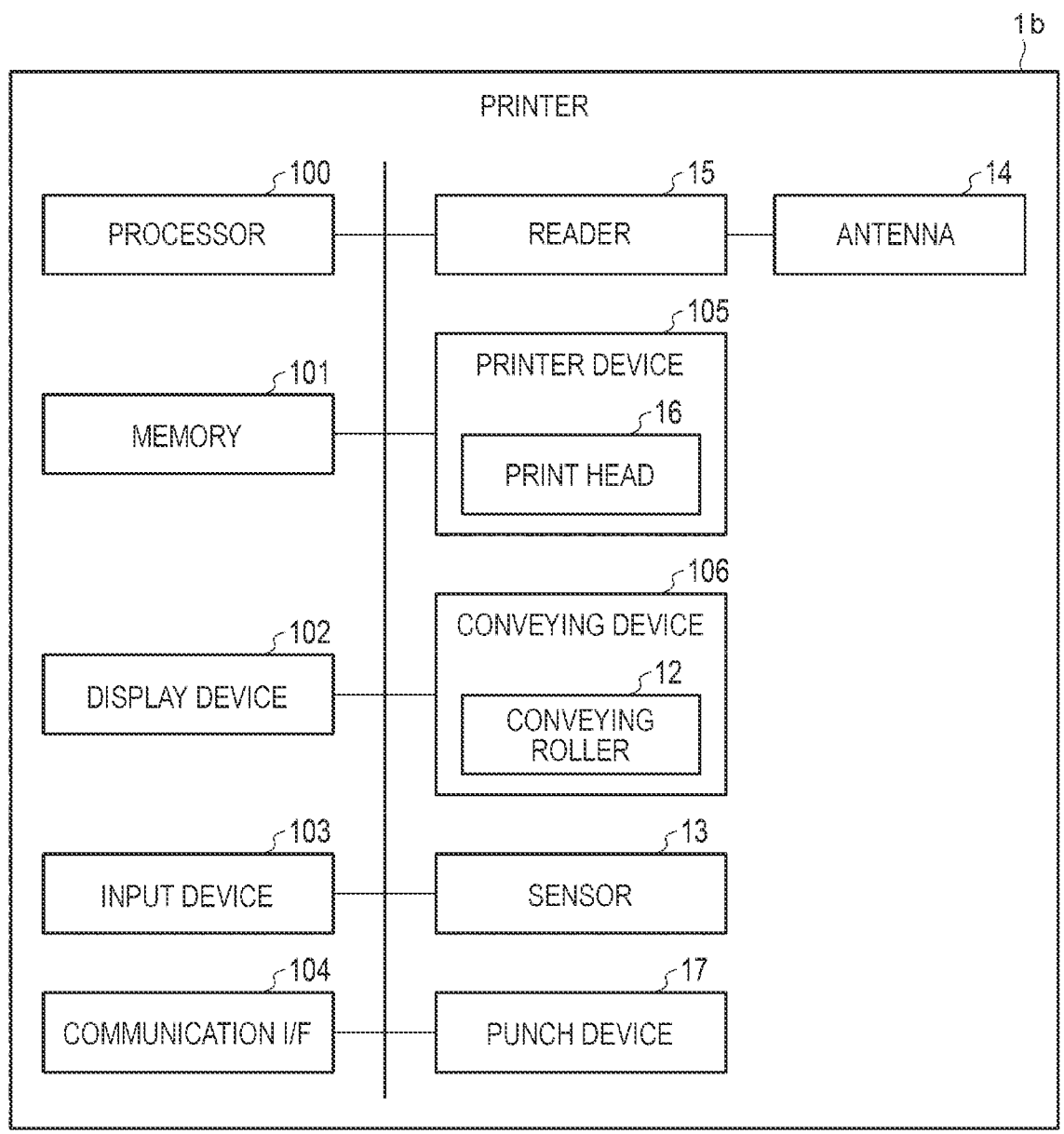
FIG. 9 is a block diagram illustrating aspects of a printer according to a second embodiment.

FIG. 9 is a block diagram of the printer 1b.

The printer 1b includes the processor 100, the memory 101, the display device 102, the input device 103, the communication interface 104, the printer device 105, and the conveying device 106. In FIG. 9, the interface is labeled as "I/F".

The server 2 may be the same as in the first embodiment described using FIG. 5, and the description thereof will be omitted.

Operation Example

Next, processes by the processor 100 of the printer 1b and the processor 21 of the server 2 in the second embodiment will be described.

The procedures described below are merely exemplary and may be changed as long as results of the processes are substantially similar.

Figure 10:
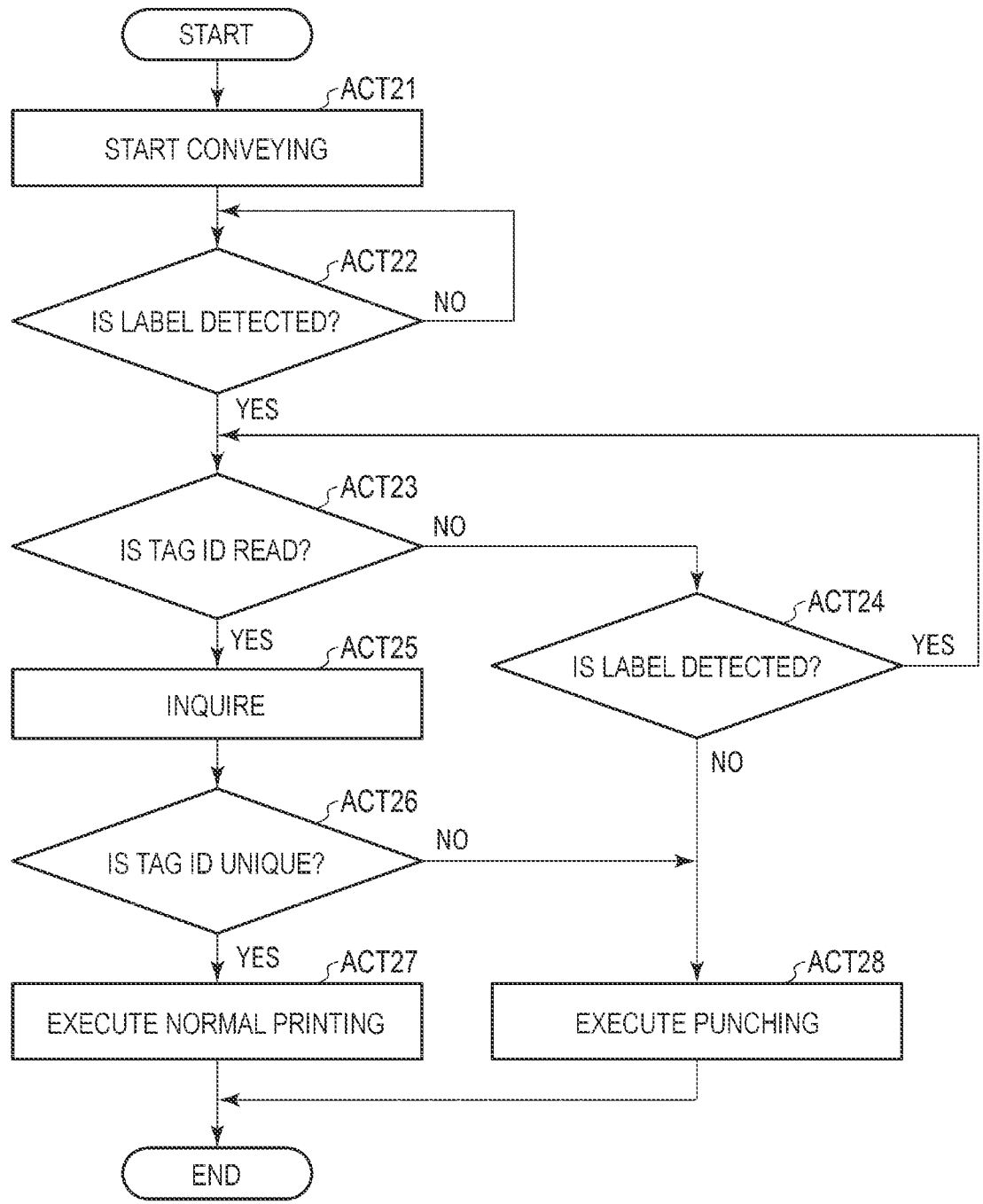
FIG. 10 is a flowchart of a process by a printer according to a second embodiment.

FIG. 10 is a flowchart illustrating an example of the process by the printer 1b.

Here, for example, the process of any printer 1b among the one or more printers 1b will be described.

The processes of ACT 21 to ACT 26 may be the same as processes of ACT 1 to ACT 6 described in the first embodiment using FIG. 6, and the description thereof will be omitted.

In ACT 27 and ACT 28, the processor 100 executes, on the label 111, a control corresponding to whether the tag ID read by the reader 15 is a unique tag ID. Here, the processor 100 sets whether or not to cause the punch device 17 to punch the wireless tag 1111 depending on whether the tag ID read by the reader 15 is a unique tag ID. If the tag ID read by the reader 15 is a unique tag ID, the processor 100 controls the punch device 17 not to punch the wireless tag 1111. On the other hand, if the tag ID read by the reader 15 is not a unique tag ID, the processor 100 controls the punch device 17 to punch the wireless tag 1111. The wireless tag 1111 is punched to distinguish between s label 111 containing s wireless tag 1111 that stores a unique tag ID and s label 111 containing s wireless tag 1111 that stores a non-unique tag ID. Such processing is to prevent erroneous use of the label 111 containing a wireless tag 1111 that stores a non-unique tag ID.

If the tag ID read by the reader 15 is a unique tag ID, the processor 100 controls the printer device 105 to execute normal printing on the label 111 (ACT 27). The process of ACT 27 may be the same as the process of ACT 7 described in the first embodiment using FIG. 6, and the description thereof will be omitted. After executing normal printing on the label 111, the processor 100 controls the punch device 17 not to punch the wireless tag 1111.

If the tag ID read by the reader 15 is not a unique tag ID, the processor 100 controls the punch device 17 to punch the wireless tag 1111 that stores a non-unique tag ID (ACT 28).

The process by the server 2 may be the same as the process described in the first embodiment using FIG. 7, and the description thereof will be omitted.

Effects

The wireless tag-containing medium issuing apparatus according to the second embodiment includes a breakage unit. The control unit changes whether to cause the breakage unit to break the wireless tag depending on whether the identification information for a label is unique information.

As a result, the wireless tag-containing medium issuing apparatus can distinguish between a medium containing a wireless tag that stores unique identification information and a medium containing a wireless tag that stores non-unique identification information. Therefore, the wireless tag-containing medium issuing apparatus can prevent issuance of a medium containing a wireless tag that stores non-unique identification information.

Third Embodiment

Hereinafter, a third embodiment will be described using the drawings.

In the third embodiment, the same configurations as those of the first embodiment are represented by the same reference numerals, and the detailed description thereof will be omitted. For the third embodiment, differences from the first embodiment will be mainly described.

Configuration Example

Figure 11:
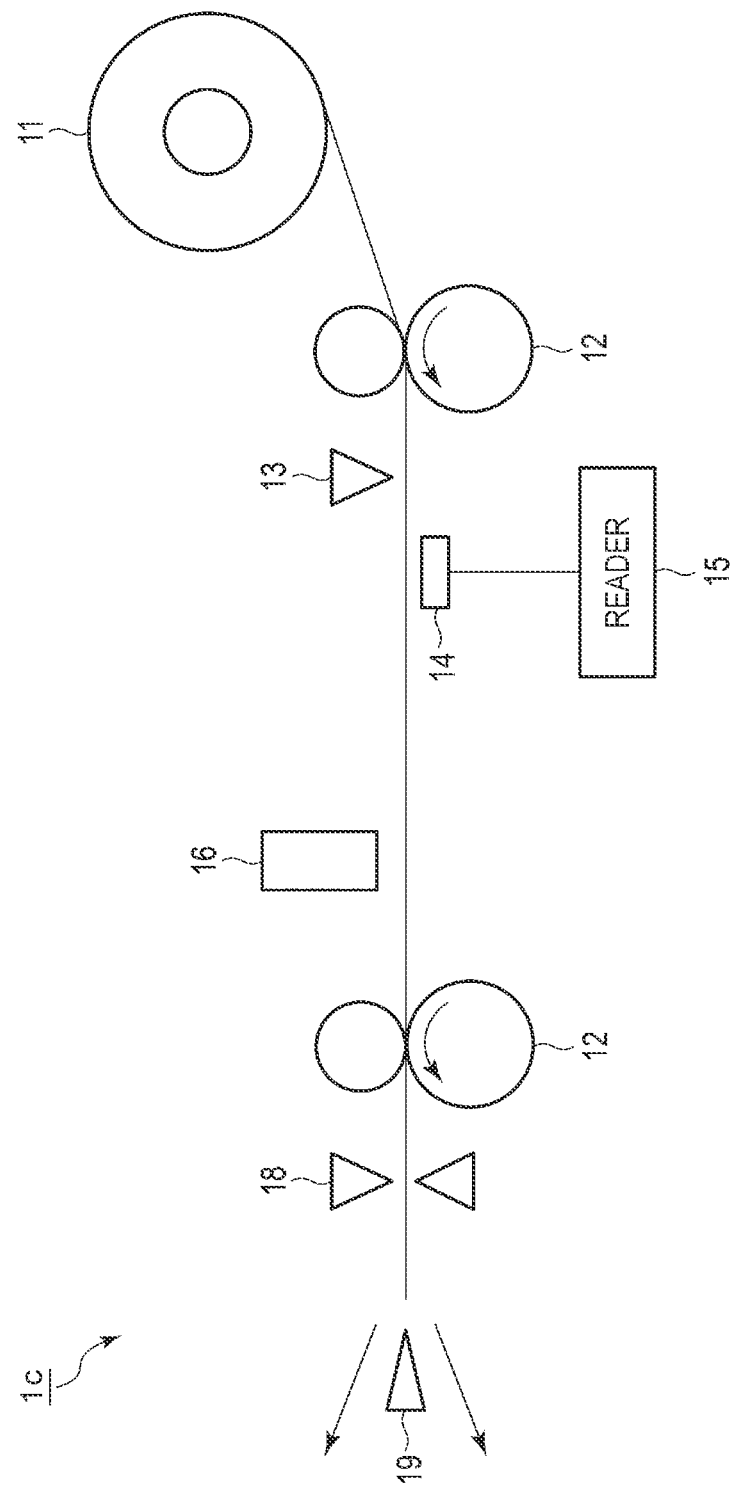
FIG. 11 is a diagram of a printer according to a third embodiment.

A wireless tag-containing medium issuing system S may be the same overall as the configuration example described in the first embodiment using FIG. 1 (excepting at least one printer 1 is replaced with a printer 1c). FIG. 11 is a diagram illustrating a configuration example of the printer 1c.

As in the first embodiment, the printer 1c includes the sheet 11, the plurality of conveying rollers 12, the sensor 13, the antenna 14, the reader 15, and the print head 16. Unlike the first embodiment, the printer 1c includes a cutter 18 and a flapper 19.

The cutter 18 is a device that cuts the sheet 11 to separate the label 111 at the head in the conveying direction from the sheet 11. The cutter 18 is provided downstream of the print head 16 in the conveying direction. The cutter 18 is an example of a cutting unit configured to cut the sheet 11.

The flapper 19 is a device for switching a conveyance path of the label 111 once separated from the sheet 11 by the cutter 18. The flapper 19 is driven based on a control of the processor 100 to switch the conveyance path of the label 111 to a first conveyance path or a second conveyance path different from the first conveyance path. The flapper 19 is an example of a path switching unit configured to switch the conveyance path of the label 111.

Figure 12:
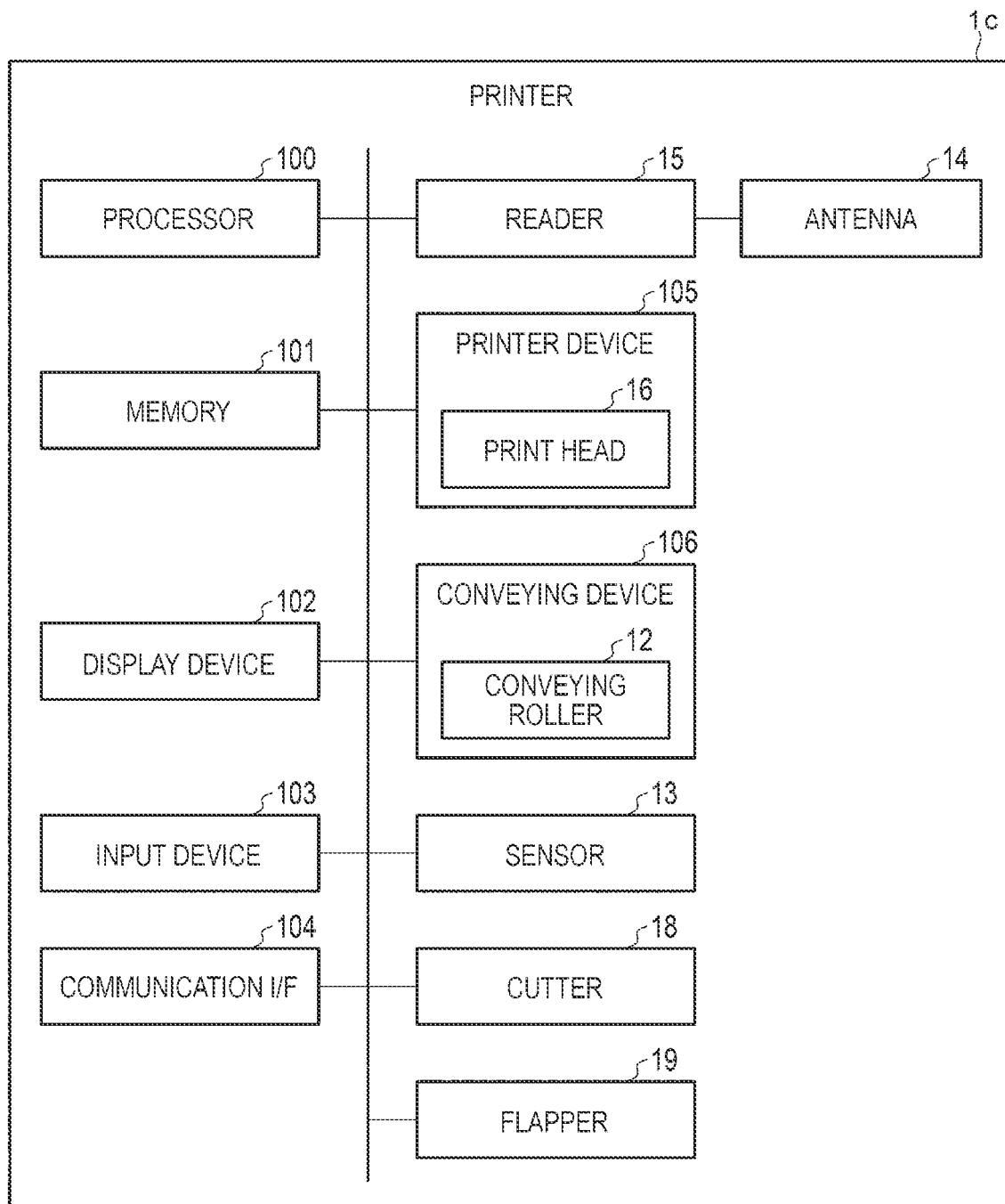
FIG. 12 is a block diagram illustrating aspects of a printer according to a third embodiment.

FIG. 12 is a block diagram of the printer 1c.

As in the first embodiment, the printer 1c includes the processor 100, the memory 101, the display device 102, the input device 103, the communication interface 104, the printer device 105, and the conveying device 106. In FIG. 12, the interface is labeled as "I/F".

The server 2 may be the same as in the first embodiment.

Operation Example

Next, processes by the processor 100 of the printer 1c and the processor 21 of the server 2 will be described. The procedures described below are merely exemplary and may be changed as long as results of the processes are substantially similar.

Figure 13:
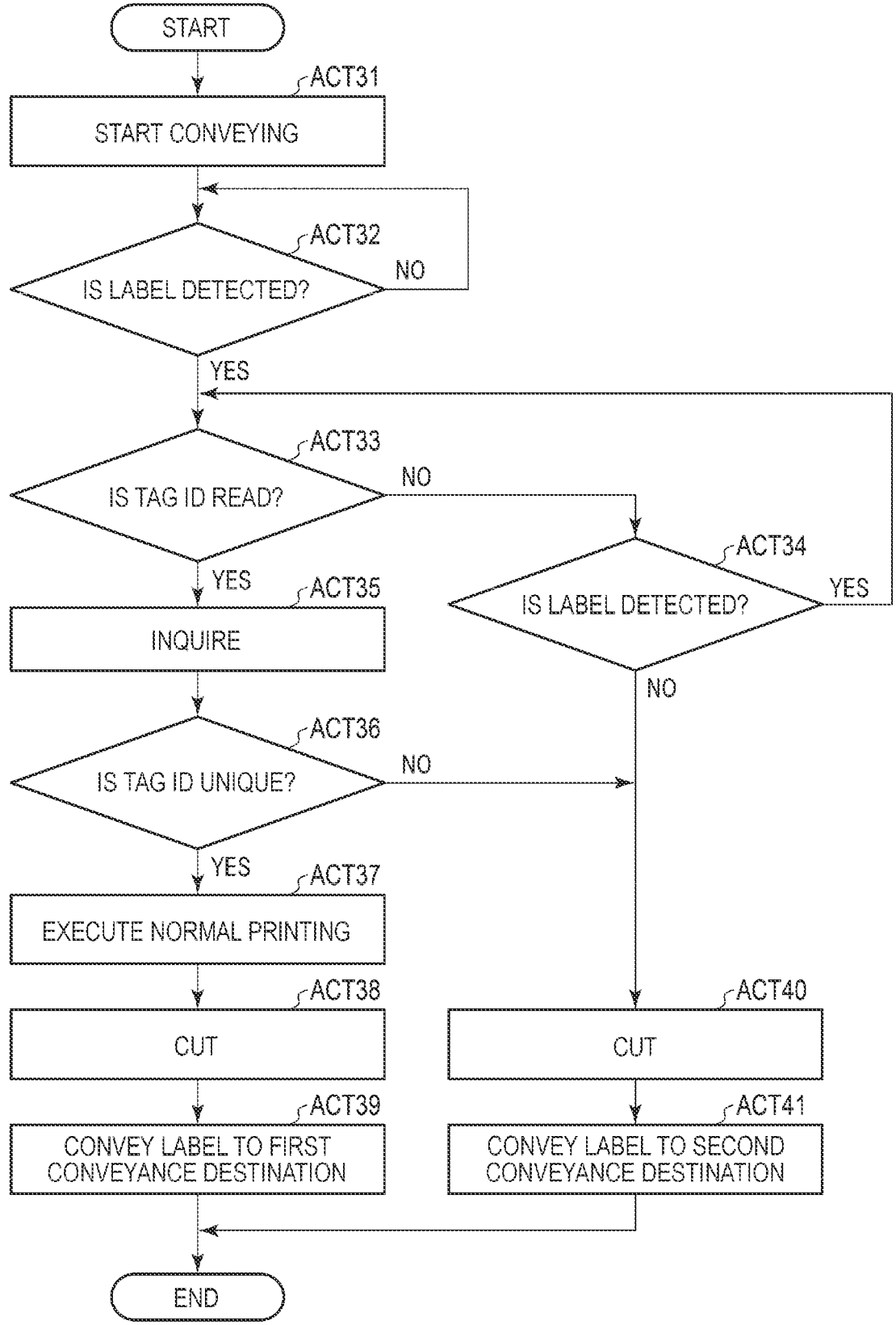
FIG. 13 is a flowchart of a process by a printer according to a third embodiment.

FIG. 13 is a flowchart illustrating an example of the processing by the printer 1c.

The processes of ACT 31 to ACT 36 may be the same as processes of ACT 1 to ACT 6 described in the first embodiment using FIG. 6.

In ACT 39 and ACT 41, the processor 100 executes, on the label 111, a control according to whether the tag ID read by the reader 15 is a unique tag ID or not. Here, the processor 100 changes a conveyance destination of the label 111 depending on whether the tag ID read by the reader 15 is a unique tag ID. The conveyance destination of the label 111 may include a unit configured to accumulate labels 111. The unit configured to accumulate the labels 111 may be a tray. Hereinafter, the conveyance destination for the label 111 through the first conveyance path will be referred to as a "first conveyance destination". The first conveyance destination may include a first unit configured to accumulate the labels 111. The first unit may be a first tray. The first conveyance destination is an example of a first accumulation unit. The conveyance destination for the label 111 through the second conveyance path will be referred to as a "second conveyance destination". The second conveyance destination may include a second unit configured to accumulate the labels 111. The second unit may be a second tray. The second conveyance destination is an example of a second accumulation unit. If the tag ID read by the reader 15 is a unique tag ID, the processor 100 executes a control to convey the label 111 to the first conveyance destination. On the other hand, if the tag ID read by the reader 15 is not a unique tag ID, the processor 100 executes a control to convey the label 111 to the second conveyance destination. The conveyance destination of the label 111 is changed to distinguish between a label 111 containing a wireless tag 1111 that stores a unique tag ID and a label 111 containing a wireless tag 1111 that stores a non-unique tag ID.

If the tag ID read by the reader 15 is a unique tag ID, the processor 100 controls the printer device 105 to execute normal printing on the label 111 (ACT 37). The process of ACT 37 may be the same as the process of ACT 7 described in the first embodiment using FIG. 6.

The processor 100 controls the cutter 18 to cut the sheet 11 (ACT 38). The cutter 18 cuts the sheet 11 to separate the label 111 containing the wireless tag 1111 that stores a unique tag ID from the sheet 11.

The processor 100 controls the conveying device 106 and the flapper 19 to convey the label 111 separated from the sheet 11 to the first conveyance destination (ACT 39). The flapper 19 moves to a position where the conveyance path of the label 111 will be the first conveyance path. The conveying device 106 conveys the label 111 to the first conveyance destination through the first conveyance path.

If the tag ID read by the reader 15 is not a unique tag ID, the processor 100 controls the cutter 18 to cut the sheet 11 (ACT 40). The cutter 18 cuts the sheet 11 to separate the label 111 containing the wireless tag 1111 that stores a non-unique tag ID from the sheet 11.

The processor 100 controls the conveying device 106 and the flapper 19 to convey the label 111 separated from the sheet 11 to the second conveyance destination (ACT 41). The flapper 19 moves to a position where the conveyance path of the label 111 will be the second conveyance path. The conveying device 106 conveys the label 111 to the second conveyance destination through the second conveyance path.

The process by the server 2 may be the same as the process described in the first embodiment using FIG. 7.

Effects

In the wireless tag-containing medium issuing apparatus according to the third embodiment, the control unit changes a conveyance destination of the medium depending on whether the identification information is unique information.

As a result, the wireless tag-containing medium issuing apparatus can distinguish between a medium containing a wireless tag that stores unique identification information and a medium containing a wireless tag that stores non-unique identification information. Therefore, the wireless tag-containing medium issuing apparatus can prevent issuance of a medium containing a wireless tag that stores non-unique identification information.

Other Embodiments

In the above-described embodiments, the printer 1 (1b, 1c) inquires of the server 2 regarding tag ID uniqueness. However, the embodiments are not limited thereto. If just one printer 1 is in the wireless tag-containing medium issuing system S or the like, the printer 1 may determine whether the tag ID read by the reader 15 is a unique tag ID without inquiring to the server 2. In an example, the memory 101 stores registered tag IDs of the plurality of wireless tags 1111 previously read by the printer 1. The processor 100 compares the tag ID read by the reader 15 to the plurality of registered tag IDs stored in the memory 101. If the tag ID read by the reader 15 does not match any of the already registered tag IDs, the processor 100 determines that the tag ID is a unique tag ID. On the other hand, if the tag ID read by the reader 15 matches any of the already registered tag IDs, the processor 100 determines that the tag ID is not a unique tag ID. If the tag ID read by the reader 15 is a unique tag ID, the processor 100 stores the tag ID in the memory 101 as another registered tag ID.

In the above-described embodiments, the example where the printer 1 (1b, 1c) that issues the label 111 is the wireless tag-containing medium issuing apparatus is described. However, the embodiments are not limited thereto. The wireless tag-containing medium issuing apparatus may be a multi-functional peripheral (MFP). In such an example, a sheet of paper rather than label stock or the like may contain a wireless tag. A program or programs corresponding to an embodiment may be transferred already stored in an electronic apparatus or may be transferred separately. In the latter case, a program may be transferred via a network or may be transferred by being recorded in a recording medium, that is a non-transitory tangible medium that is computer-readable. In general, the form or format of the recording medium is not limited as long as it is a medium, such as a CD-ROM or a memory card, that can store the program and can be read by a computer.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such embodiments or modifications as would fall within the scope and spirit of the inventions.

What is claimed is:

1. A wireless tag-containing medium issuing apparatus, comprising:
    a conveying roller configured to convey a medium including a wireless tag;
    an antenna for communicating with the wireless tag;
    a reader configured to read a tag identification from the wireless tag through the antenna; and
    a control unit configured to:
        compare the read tag identification to stored tag identifications, and
        execute a first operation on the medium if the read tag identification matches a stored tag identification and a second operation on the medium if the read tag identification does not match a stored tag identification, wherein
    the first operation is different from the second operation.

2. The wireless tag-containing medium issuing apparatus according to claim 1, further comprising:
    a printing unit configured to print on the medium including the wireless tag, wherein
    the first operation is a printing of a first image by the printing unit on the medium, and
    the second operation is a printing of a second image by the printing unit on the medium, the second image being different than the first image.

3. The wireless tag-containing medium issuing apparatus according to claim 1, further comprising:
    a wireless tag breakage unit configured to disable the wireless tag on the medium, wherein
    the first operation is controlling the wireless tag breakage unit to disable the wireless tag on the medium.

4. The wireless tag-containing medium issuing apparatus according to claim 3, wherein the wireless tag breakage unit is a punch for physically disabling the wireless tag.

5. The wireless tag-containing medium issuing apparatus according to claim 1, wherein the first operation is to divert the medium to a first destination, and the second operation is to pass the medium to a second destination different than the first destination.

6. The wireless tag-containing medium issuing apparatus according to claim 1, wherein the medium is a peelable label.

7. The wireless tag-containing medium issuing apparatus according to claim 1, wherein the wireless tag is a radio frequency identification (RFID) tag.

8. The wireless tag-containing medium issuing apparatus according to claim 1, further comprising:
    a printing unit configured to print on the medium including the wireless tag; and
    a wireless tag breakage unit configured to disable the wireless tag on the medium, wherein
    the first operation is controlling the wireless tag breakage unit to disable the wireless tag on the medium.

9. The wireless tag-containing medium issuing apparatus according to claim 1, further comprising:
    a communication interface configured to connect to an external server, wherein
    the control unit compares the read tag identification to stored tag identifications by transmission of the read tag identification to the external server via the communication interface.

10. A label printer for printing on wireless tagged labels, the label printer comprising:
    a conveying roller configured to convey a label stock with a plurality of labels with wireless tags;
    a printer unit for printing on the plurality of labels;
    an antenna for communicating with a wireless tag of a label on the label stock;
    a wireless tag reader configured to read a tag ID from the wireless tag of the label on the label stock using the antenna; and
    a control unit configured to:
        compare the read tag ID of the label to stored tag IDs of previously read wireless tags, and
        execute a first operation on the label if the read tag ID matches a stored tag ID and a second operation on the label if the read tag ID does not match a stored tag ID, wherein
    the first operation is different from the second operation.

11. The label printer according to claim 10, wherein
    the first operation is a printing of a first image by the printing unit on the medium, and
    the second operation is a printing of a second image by the printing unit on the medium, the second image being different than the first image.

12. The label printer according to claim 10, further comprising:
    a wireless tag breakage unit configured to disable the wireless tag on the label, wherein
    the first operation is controlling the wireless tag breakage unit to disable the wireless tag on the label.

13. The label printer according to claim 12, wherein the wireless tag breakage unit is a punch for physically disabling the wireless tag.

14. The label printer according to claim 10, wherein the first operation is to divert the label to a first destination, and the second operation is to pass the label to a second destination different than the first destination.

15. The label printer according to claim 10, wherein the label is a peelable label.

16. The label printer according to claim 10, wherein the wireless tag is a radio frequency identification (RFID) tag.

17. The label printer according to claim 10, further comprising:
    a communication interface configured to connect to an external server, wherein the control unit compares the read tag ID to stored tag IDs by transmission of the read tag ID to the external server via the communication interface.

18. A label printing system, comprising:
    a server device; and
    a label printer connected to the server device, the label printer including:
        a conveying roller configured to convey a label stock with a plurality of labels with wireless tags;
        a printer unit for printing on the plurality of labels;
        an antenna for communicating with a wireless tag of a label on the label stock;
        a wireless tag reader configured to read a tag ID from the wireless tag of the label on the label stock using the antenna; and
        a control unit configured to:
            send the read tag ID of the label to the server device and receive a comparison result for the tag ID indicating whether the tag ID matches a previously read tag ID stored on the server device, execute a first operation on the label if the read tag ID matches a previously read tag ID and a second operation on the label if the read tag ID does not match a previously read tag ID, wherein the first operation is different from the second operation.

19. The label printing system according to claim 18, wherein the first operation is a printing of a first image by the printing unit on the medium, and the second operation is a printing of a second image by the printing unit on the medium, the second image being different than the first image.

20. The label printing system according to claim 18, further comprising:

a wireless tag breakage unit configured to disable the wireless tag on the label, wherein the first operation is controlling the wireless tag breakage unit to disable the wireless tag on the label.

* * * * *